(12) United States Patent
Inoue

(10) Patent No.: US 6,534,019 B1
(45) Date of Patent: Mar. 18, 2003

(54) AUTOMATED CHEMICAL SYNTHESIZER

(75) Inventor: Takaaki Inoue, Moriyama (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 09/447,563

(22) Filed: Nov. 23, 1999

(30) Foreign Application Priority Data

Dec. 24, 1998 (JP) .......................... 10-366952

(51) Int. Cl.[7] .............................................. B01J 19/00
(52) U.S. Cl. ..................... 422/130; 422/63; 422/65; 422/67; 422/81; 422/99; 422/100; 422/101; 422/102; 422/103; 422/104; 422/129; 436/43; 436/49
(58) Field of Search .............................. 422/63, 65, 67, 422/81, 99, 100, 101, 102, 103, 104, 129, 130, 131, 89; 436/43, 49

(56) References Cited

U.S. PATENT DOCUMENTS

| | | | |
|---|---|---|---|
| 4,746,490 A | * 5/1988 | Saneii ........................ | 422/111 |
| 4,895,706 A | * 1/1990 | Root et al. .................. | 422/102 |
| 4,980,130 A | * 12/1990 | Metzger et al. ............. | 422/100 |
| 5,252,296 A | * 10/1993 | Zuckermann et al. ....... | 422/116 |
| 5,260,028 A | * 11/1993 | Astle ........................ | 210/635 |
| 5,395,594 A | * 3/1995 | Nokihara et al. ............ | 422/100 |
| 5,503,805 A | * 4/1996 | Sugarman et al. ........... | 422/110 |
| 5,531,959 A | * 7/1996 | Johnson et al. ............ | 210/198.2 |
| 5,609,826 A | * 3/1997 | Cargill et al. .............. | 422/101 |
| 5,660,792 A | * 8/1997 | Koike ........................ | 422/100 |
| 5,762,881 A | * 6/1998 | Harness et al. .............. | 422/132 |
| 5,792,430 A | * 8/1998 | Hamper ....................... | 422/102 |
| 5,906,796 A | * 5/1999 | Blevins et al. .............. | 422/102 |
| 5,961,925 A | * 10/1999 | Ruediger et al. ............ | 422/100 |
| 5,976,470 A | * 11/1999 | Maiefski et al. ............ | 222/485 |
| 6,056,926 A | * 5/2000 | Hiroshima ................... | 162/21 |
| 6,117,397 A | * 9/2000 | Antonenko et al. ......... | 422/101 |
| 6,126,904 A | * 10/2000 | Zuellig et al. ............. | 422/101 |
| 6,133,045 A | * 10/2000 | Johnson et al. ............. | 210/406 |
| 6,258,323 B1 | * 7/2001 | Hormann et al. ............. | 422/101 |
| 6,274,094 B1 | * 8/2001 | Weller et al. ............... | 422/100 |
| 2001/0001643 A1 | * 5/2001 | Simpson et al. ............. | 422/101 |

* cited by examiner

*Primary Examiner*—Arlen Soderquist
*Assistant Examiner*—Elizabeth Quan
(74) *Attorney, Agent, or Firm*—Oblon, Spivak, McClelland, Maier & Neustadt, P.C.

(57) ABSTRACT

An automated chemical synthesizer includes a reaction vessel and a collection vessel. A passage block in which the passage is formed and which is provided between the reaction vessel and the collection vessel when the collection vessel is connected to the reaction vessel in a collection position. The passage includes a discharging hole and a connecting hole which is provided to correspond to the collection vessel. The collection vessel contacts the passage block around the connecting hole. The passage block includes upper and lower plates. A lower portion of the connecting hole formed in the lower plate has a size such that a top portion of the collection vessel fits into the lower portion. An upper portion of the connecting hole formed in the upper plate has a size such that a top portion of the collection vessel contacts the upper plate around the upper portion.

16 Claims, 9 Drawing Sheets

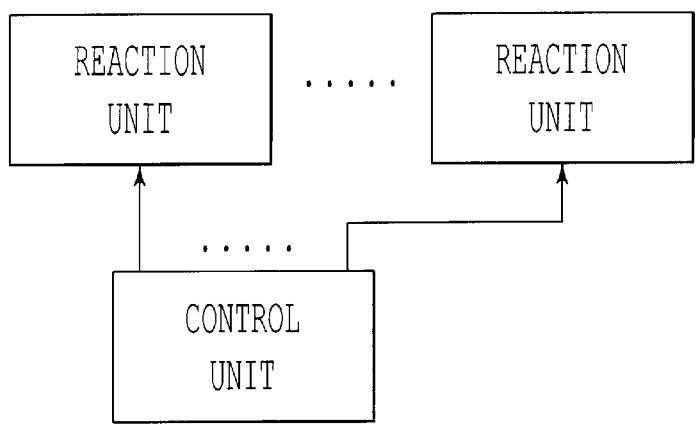
FIG. 12
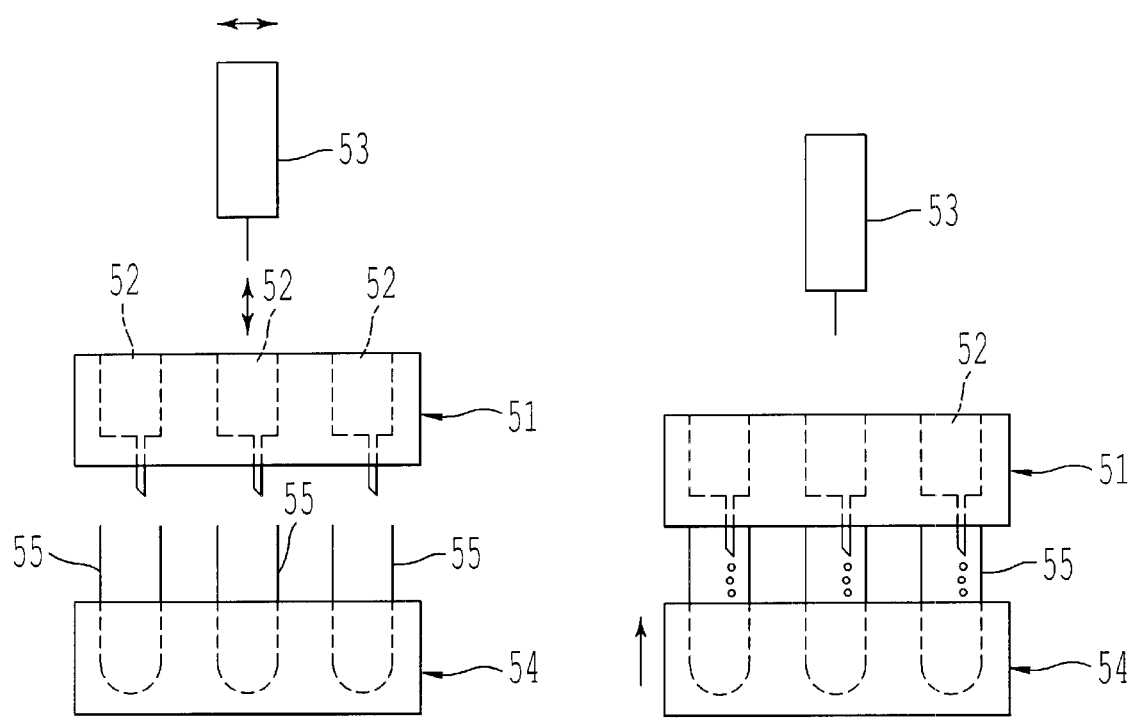
FIG. 13
PRIOR ART
FIG. 14
PRIOR ART

AUTOMATED CHEMICAL SYNTHESIZER

CROSS-REFERENCE TO RELATED APPLICATIONS

The present application claims priority under 35 U.S.C. §119 to Japanese Patent Application No. 10-366,952, filed Dec. 24, 1998, entitled "Automated Synthesizing Apparatus." The contents of that application are incorporated herein by reference in their entirety.

BACKGROUND OF THE INVENTION

1. Field of the Invention

The present invention relates to an automated chemical synthesizer which includes a mechanism configured to prevent the diffusion of gas which is produced when compounds are collected.

2. Description of the Background

Automated chemical synthesizers have been used for research in the fields of pharmaceutical, life science, chemistry and material science among others.

FIGS. 13 and 14 show a conventional automated chemical synthesizer. Referring to FIGS. 13 and 14, the automated chemical synthesizer has a syringe 53 and a reaction block 51 including multiple reaction vessels 52 in which synthetic reactions take place. The syringe 53 dispenses solvents and reagents to the reaction vessels 52 according to preset dispensing protocols. Furthermore, in the automated chemical synthesizer, synthetic reactions in the reaction vessels 52 take place in parallel. Therefore, the automated chemical synthesizer synthesizes multiple experimental chemical compounds simultaneously. Then, compounds synthesized in the reaction vessels 52 are collected respectively.

The automated chemical synthesizer includes a collecting block 54 which holds a number of collection vessels 55. Chemical compounds synthesized in the reaction vessels 52 are collected in the collection vessels 55. The collection vessels 55 are provided in the same manner as the reaction vessels 52. The number of the collection vessels 55 is same as that of the reaction vessels 52. To collect synthesized chemical compounds, the collecting block 54 rises until the top portions of the collection vessels 55 contact with the lower surface of the reaction block 51. The collecting block 54 is set below the reaction block 51 so that the collection vessels 55 communicate with the reaction vessels 52. Hence, the compounds are transferred from the reaction vessels 52 into the collection vessels 55.

However, in this automated chemical synthesizer, gas which is produced when compounds are synthesized and collected may leak from a gap created between the lower surface of the reaction block 51 and the top portions of the collection vessels 55. The gas is sometimes harmful.

For instance, in a synthesis involving a solid phase reaction, synthesized chemical compounds are produced in resin granules and thus are extracted by a solvent, usually a strong acid such as Tri-Fluoroacetate ("TFA"). In the conventional automated chemical synthesizers, the harmful gas from such a solvent could leak from the gap between the reaction vessels and the collection vessels, and diffuse into the chemical synthesizer. The gas could not only corrode the chemical synthesizer but also harm the people around it.

SUMMARY OF THE INVENTION

An object of the present invention is to provide an automated chemical synthesizer which includes a mechanism configured to prevent the diffusion of gas which is produced when synthesized compounds are collected.

This object is achieved according to the present invention by providing a novel automated chemical synthesizer including at least one reaction vessel, at least one collection vessel, a passage and a gas discharging unit. A compound is to be synthesized in the at least one reaction vessel. The at least one collection vessel is configured to be connected to the at least one reaction vessel in order to collect the compound from the at least one reaction vessel. The passage is configured to communicate with the at least one collection vessel. The gas discharging unit is provided in the passage and configured to discharge gas from the at least one collection vessel through the passage.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which:

FIG. 12 is a block diagram showing an automated chemical synthesizer for synthesizing compounds according to a fifth embodiment of the present invention;

FIG. 13 shows a syringe, a reaction block and a collection block of a conventional automated chemical synthesizer; and FIG. 14 shows a syringe, a reaction block and a collection block of a conventional automated chemical synthesizer when the collection block is in a collection position.

DETAILED DESCRIPTION OF THE PREFERRED EMBODIMENTS

Figure 1:
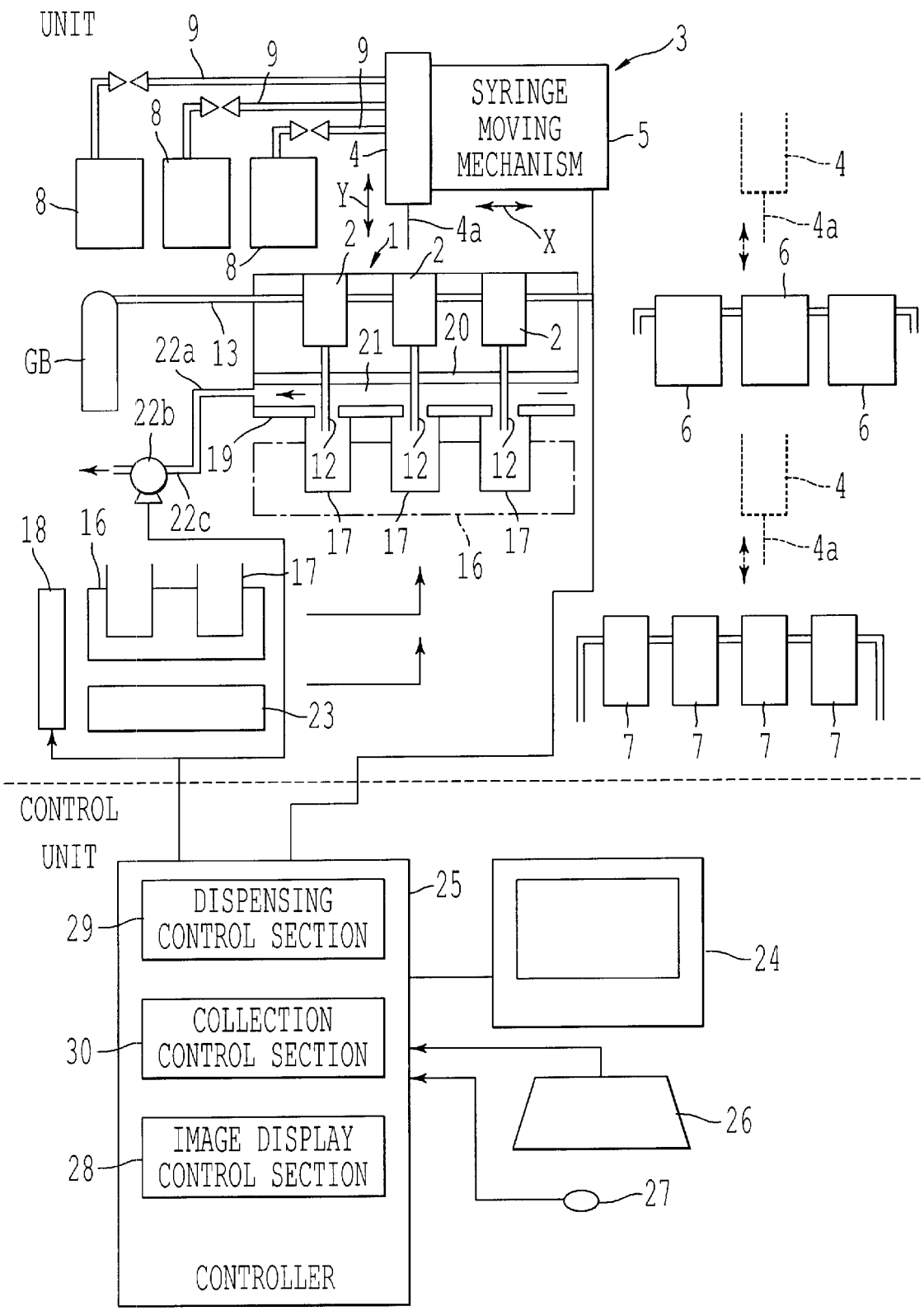
FIG. 1 is a block diagram showing an automated chemical synthesizer for synthesizing organic compounds according to a first embodiment of the present invention.

The preferred embodiments will now be described with reference to the accompanying drawings, wherein like reference numerals designate corresponding or identical elements throughout the various drawings.

Figure 2:
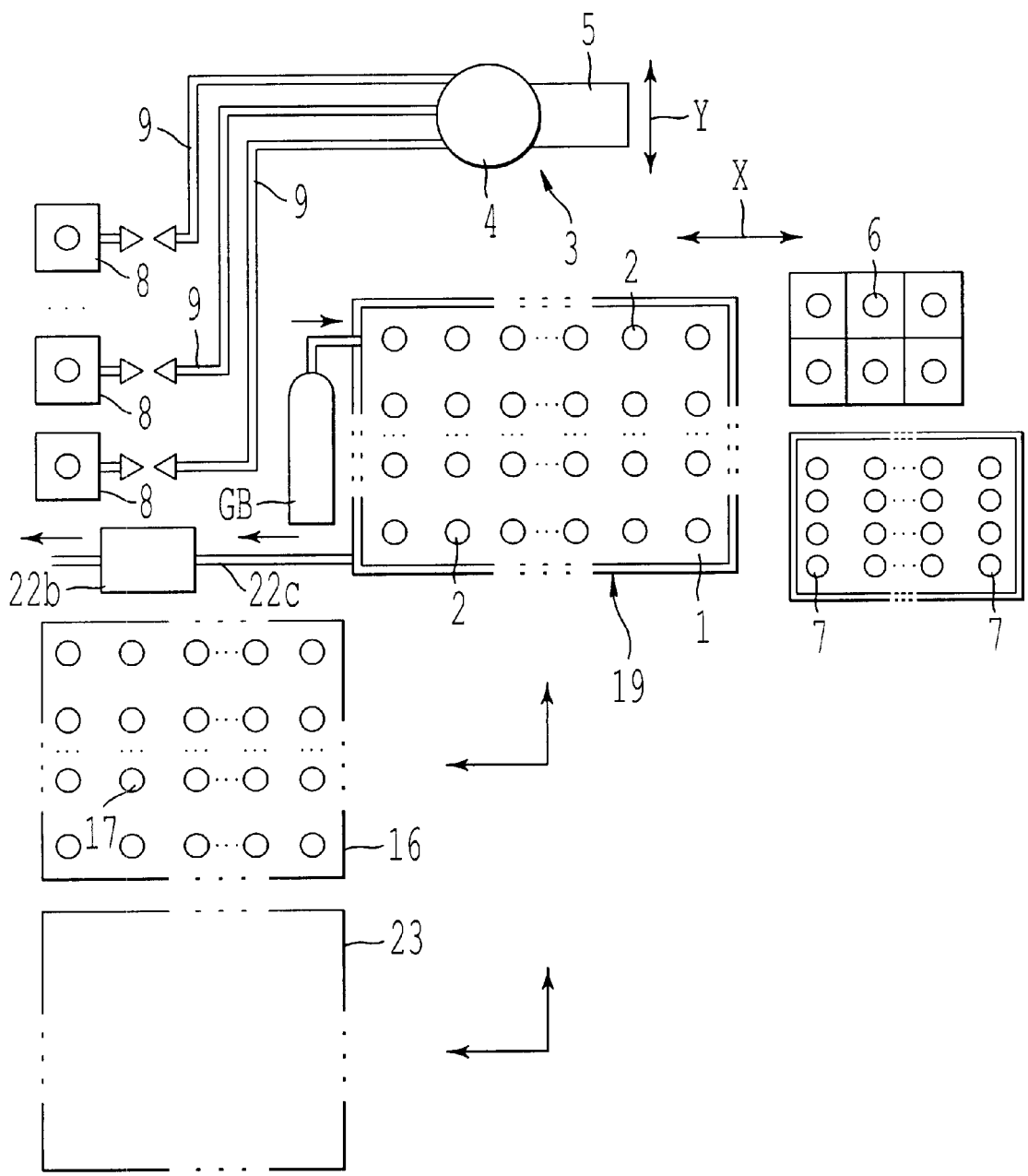
FIG. 2 is a schematic top plan view of a reaction unit of the automated chemical synthesizer shown in FIG. 1.

FIG. 1 shows an automated chemical synthesizer for synthesizing organic compounds according to a first embodiment of the present invention. Referring to FIG. 1, the automated chemical synthesizer includes a reaction unit and a control unit. In the reaction unit, synthetic reactions take place. The control unit controls the operations in the reaction unit. The reaction unit of the automated chemical synthesizer includes a reaction block 1 and a liquid dispenser 3. The reaction block 1 includes a plurality of reaction vessels 2 in which synthetic reactions take place. The liquid dispenser 3 dispenses chemical liquids, for example, reagents and solvents to the reaction vessels 2 according to preset dispensing protocols. As shown in FIG. 2, the reaction vessels 2 are arranged in a column and row matrix in the reaction block 1. The number of reaction vessels 2 provided in the reaction block 1 need not be specific but may be set, for example, around from ten to a hundred such as 24, 72 or the like.

Referring to FIGS. 1 and 2, the liquid dispenser 3 includes a syringe 4 and a syringe moving mechanism 5 which moves the syringe 4 right and left along an (X) direction, back and forward along a (Y) direction, and up and down along a (Z) direction according to the preset dispensing protocols. The syringe moving mechanism 5 moves the syringe 4 according to commands received from the control unit.

Large vials 6 which contain large use amount reagents and small vials 7 which contain small use amount reagents are provided next to the reaction block 1. Both large and small vials (6 and 7) are provided as many as needed. Also, gallon bins 8 which contain solvents are provided next to the reaction block 1. The gallon bins 8 are connected to the syringe 4 by tube lines 9, respectively.

As shown by dotted lines in FIG. 1, to dispense the reagents to the reaction vessels 2, the syringe 4 moves to the designated location in the vicinity of the large or small vials (6 or 7) which contain the reagents to be dispensed. Next, the syringe 4 draws the reagent from the designated reagent vial through a needle (4a) provided to the syringe 4. Then, the syringe 4 moves to a designated reaction vessel 2 and dispenses the drawn reagent through the needle (4a) to the designated reaction vessel 2.

To dispense the solvents to the reaction vessels 2, a designated solvent is supplied to the syringe 4 through the tube line 9. After the syringe 4 moves to the designated reaction vessel 2, the solvent supplied to the syringe 4 is dispensed to the designated reaction vessel 2 through the needle (4a).

Figure 3:
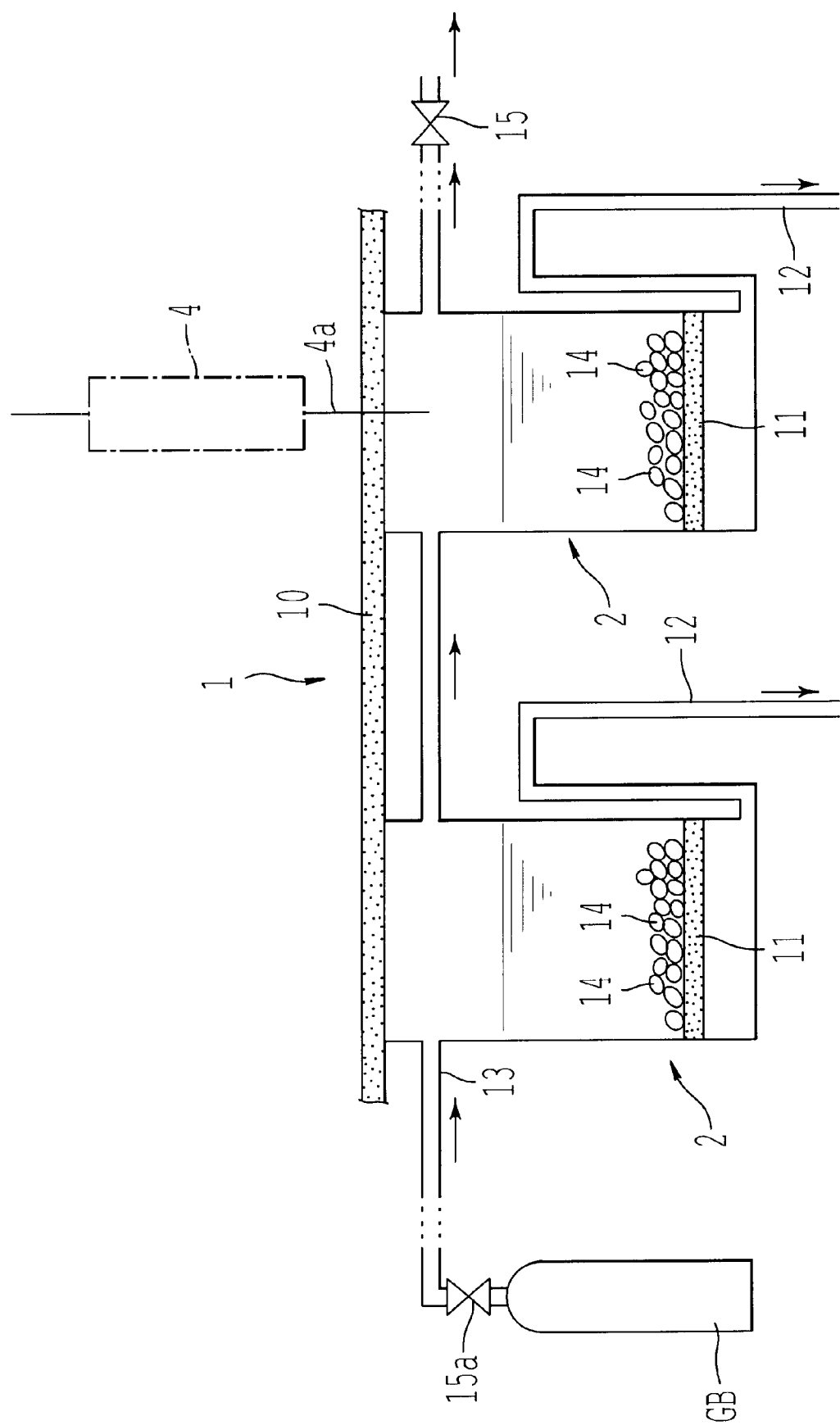
FIG. 3 is a schematic side view of main components in a reaction rack of the automated chemical synthesizer shown in FIG. 1.

Referring to FIG. 3, the reaction block I of the first embodiment includes a common septum 10, filters 11, drainage tubes 12 and a gas line 13. The common septum 10 is in a sheet form and covers dispensing openings of the reaction vessels 2. The filter 11 is provided in each reaction vessel 2 to close the bottom opening of the reaction vessel 2. A liquid passes through the filter 11 when the liquid is pressurized. Each drainage tube 12 is connected to the bottom of each reaction vessel 2. A gas tank (GB) is connected to the reaction vessels 2 via a gas line 13 in the vicinity of the dispensing openings of the reaction vessels 2. Accordingly, a pressurized gas such as a compressed inert gas can be introduced into the reaction vessels 2 from the gas tank (GB) through the gas line 13. In order to dispense the reagent or the solvent to the reaction vessel 2, the needle (4a) pierces through the common septum 10 to proceed to the inside of the reaction vessel 2. An appropriate amount of resin granules 14 is deposited inside each reaction vessel 2 for solid phase reactions. A discharging gas supply valve (15a) is provided in the gas line 13 at an upstream of the reaction vessels 2 near the gas tank (GB). An opening valve 15 is provided in the gas line 13 at a downstream of the reaction vessels 2 near the end of the gas line 13.

In a synthesis of a chemical compound in the automated chemical synthesizer of the first embodiment, necessary reagents and solvents are dispensed to the reaction vessels 2, solid phase reactions take place inside the resin granules 24, and desired compounds are thereby produced.

Referring to FIGS. 1–3, the automated chemical synthesizer of the first embodiment includes a collection block 16. The collection block 16 is provided with collection test tubes 17 which are provided in the same manner as the reaction vessels 2. The number of the collection test tubes 17 is same as that of the reaction vessels 2. A compound synthesized in each reaction vessel 2 is collected in a respective collection test tube 17. To collect synthesized compounds, a block moving device 18 brings the collection block 16 to a collection position underneath the reaction block 1 from its waiting position. Each collection test tube 17 is connected to each reaction vessel 2 when the collection block 16 is in the collection position, and each collection test tube 17 is not connected to each reaction vessel 2 when the collection block 16 is in the waiting position. When the opening of each collection test tube 17 is connected to the bottom of each reaction vessel 2, synthesized compounds are transferred from the reaction vessel 2 to the collection test tube 17.

The resin granules 14 are porous and a synthetic reactions take place inside their pores. Synthesized compounds are extracted from the pores of the resin granules 14 after the synthetic reactions are complete. In order to extract the synthesized compounds, a strong acid solvent such as TFA is supplied to each reaction vessel 2. A solvent for extraction is kept in a solvent vial 8, or may be kept in a vial 7 for a small use amount reagent. Once the synthesized compounds are extracted from the pores, the opening valve 15 is closed and the discharging gas supply valve (15a) is opened. Accordingly, pressurized gas is introduced into the reaction vessels 2 via the gas line 13 from the gas tank (GB). Subsequently, the synthesized compounds along with the extraction solvent permeate through the filter 11 due to the pressure created by the pressurized gas, and thus transferred to the collection test tubes 17. Then, after the transfer of the synthesized compounds to the collection test tubes 17 is complete, the block moving device 18 moves the collection block 16 back to the waiting position.

Additionally, in the first embodiment of the present invention, the automated chemical synthesizer is provided with a device which prevents the diffusion of harmful gas during the transfer of the synthesized compounds from the reaction vessels 2 to the collection test tubes 17.

Figure 4:
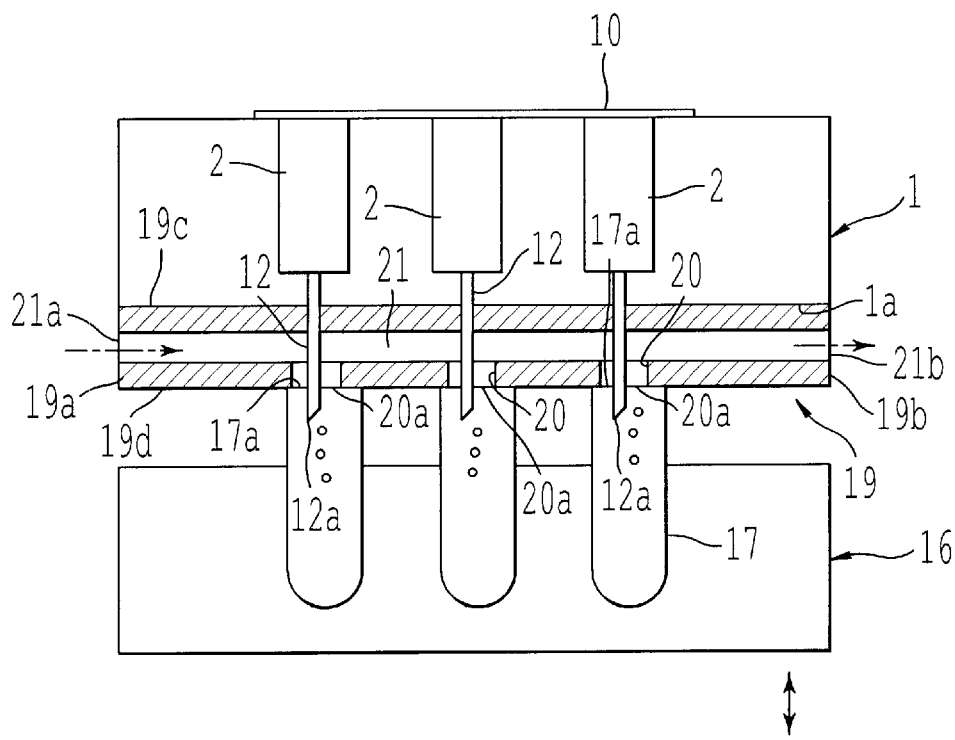
FIG. 4 is a schematic side view of both reaction and collection blocks of the automated chemical synthesizer shown in FIG. 1 when the collection block is in a collection position.
Figure 5:
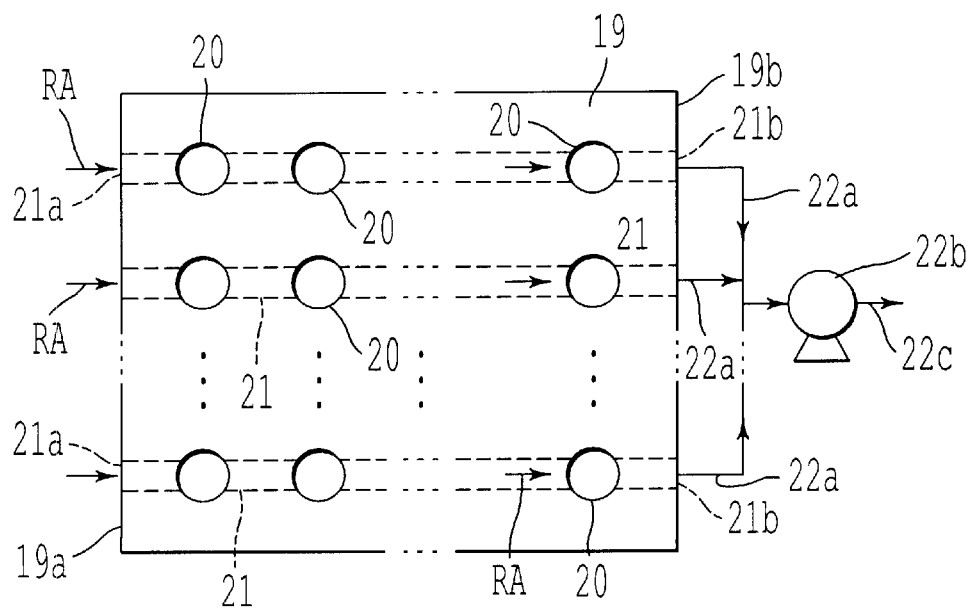
FIG. 5 is a bottom plan view of a plate of the automated chemical synthesizer shown in FIG. 1.

Referring to FIGS. 4 and 5, a plate (a passage block) 19 has an upper and lower surfaces (19c and 19d) and side surfaces (19a and 19b). The plate 19 is mounted to the reaction block 1 to contact the upper surface (19c) of the plate 19 and the lower surface (1a) of the reaction block 1. When synthesized compounds are collected in the collection test tubes 17, the block moving device 18 brings the collection block 16 to the collection position. Accordingly, the plate 19 is positioned between the reaction block 1 and the collection block 16 when synthesized compounds are collected in the collection test tubes 17. During the transfer of the synthesized compounds, the top portions (17a) of the collection test tubes 17 are pushed against the lower surface (19d) of the plate 19. Preferably, the top portions (17a) of the collection test tubes 17 hermetically contact the lower surface (19d) of the plate 19. Preferably, the plate 19 is made of a material which hermetically contacts the surface of the top portions (17a) of the collection test tubes 17. For example, the plate 19 is made of a teflon material. The collection test tubes 17 are made of glass. Further, the plate 19 and collection test tubes 17 may be made of other materials. Preferably, the plate 19 is made of a material which has an elasticity.

The plate 19 includes connecting holes 20 and discharging holes 21. The discharging holes 21 extend substantially parallel to the upper and lower surfaces (19c and 19d) and extend through the plate 19. Accordingly, the discharging holes 21 have openings (21a and 21b) on the side surfaces (19a and 19b). The connecting holes 20 extend from the discharging hole 21 toward the lower surface (19d) substantially perpendicular to the lower surface (19d). The connecting holes 20 have connecting openings (20a) on the lower surface (19d). The connecting holes 20 and the discharging holes 21 are straight holes. The number of the connecting holes 20 is equal to the number of the reaction vessels 2. Accordingly, each reaction vessel 2 corresponds to each connecting hole 20. The number of the discharging holes 21 is equal to the number of the row of the reaction vessels 2. Each discharging hole 21 communicates with the connecting holes 20 in each row. The drainage tube 12 extends through the plate 19 and projects from the lower surface (19d) of the plate 19 at the connecting opening (20a). Accordingly, when the collection block 16 is in the collection position, the end portion (12a) of the drainage tube 12 is introduced into the collection test tube 17 and thereby each reaction vessel 2 communicates with each collection test tube 17.

Referring to FIG. 5, the openings (21b) of the discharging holes 21 are connected to an exhaust duct (22c) via branch ducts (22a). An exhaust pump (22b) is provided in the exhaust duct (22c). Accordingly, when the exhaust pump (22b) is driven, air flows from the openings (21a) toward the exhaust pump (22b) via the discharging holes 21, the branch ducts (22a) and the exhaust duct (22c) as shown by an arrow (RA). The gas flowing from the opening of the collection test tube 17 is discharged together with air from the exhaust duct (22c). The gas is sometimes harmful to human or the chemical synthesizer. Therefore, the gas does not diffuse inside the automated chemical synthesizer.

The exhaust pump (22b) is not necessarily a high power pump. Further, the exhaust pump (22b) may be substituted by an exhaust fan. The exhaust pump (22b) is driven during a substantially entire period of time in which the compounds are collected from the reaction vessels 2 to the collection test tubes 17. The exhaust pump (22b) may be driven in other manners. The exhaust pump (22b) may be only for a minimum length of time necessary. For example, the exhaust pump (22b) is driven during a short period within the entire period of time in which the compounds are collected from the reaction vessels 2 to the collection test tubes 17.

Figure 6:
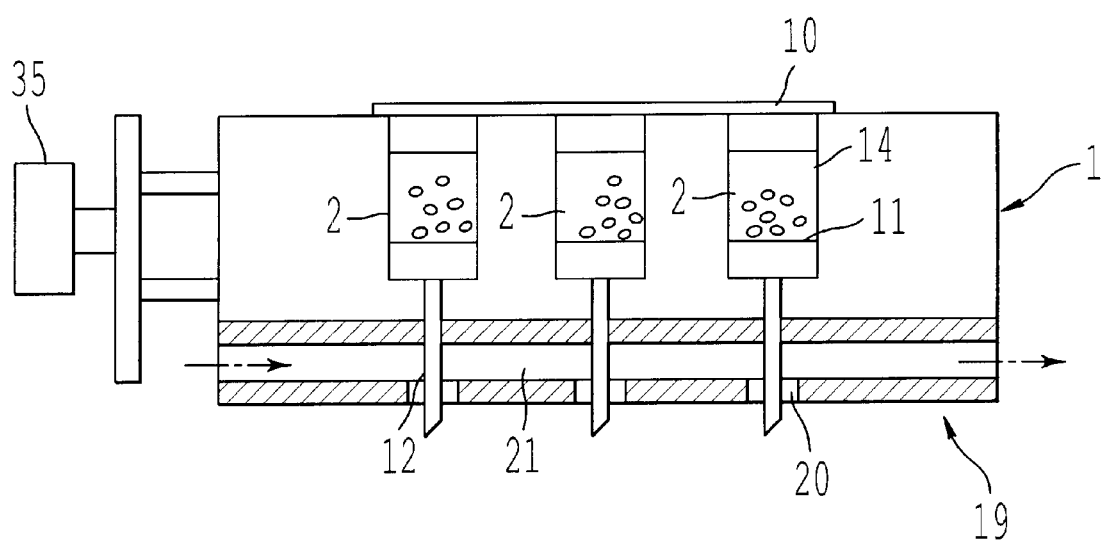
FIG. 6 shows a vibrator connected to the reaction block of the automated chemical synthesizer according to the first embodiment of the present invention.

Referring to FIGS. 1, 2 and 6, the automated chemical synthesizer of the first embodiment further includes a discharging tray 23 and a vibrator 35. Waste materials produced in the reaction vessels 2 during the chemical reactions are discarded to the discharging tray 23. The block moving device 18 also moves the discharging tray 23 between a waiting position and a discarding position underneath the reaction block 1. As shown in FIG. 6, the vibrator 35 vibrates the reaction block 1 during a synthesis. Thus, the resin granules 14 in the reaction vessels 2 are vibrated, thereby promoting the chemical reactions occurred in the resin granules 14.

Referring to FIG. 1, the control unit in the first embodiment will be explained. In FIG. 1, the control unit of the automated chemical synthesizer of the first embodiment includes a monitor 24, a controller 25, a keyboard 26 and a mouse (or a pointing device) 27. The monitor 24 displays protocol setting pictures such as graphical user interfaces for example, necessary for the operation of the automated chemical synthesizer. The controller 25 controls the operation of the automated chemical synthesizer.

The controller 25 in FIG. 1 includes an image display control section 28, a dispensing control section 29 and a collection control section 30. The image display control section 28 controls the monitor 24 to display the protocol setting pictures necessary for the operation of the automated chemical synthesizer. The dispensing control section 29 controls the operation of the liquid dispenser 3 based on the preset dispensing protocols. The collection control section controls the transferring operation of the synthesized compounds by sending command signals to the block moving device 18, the exhaust pump 22b and the valves 15 and (15a).

Dispensing and collection protocols are set by clicking the mouse on appropriate items in the protocol setting pictures. The control unit of the first embodiment described above comprises a personal computer in which software is installed.

Figure 7:
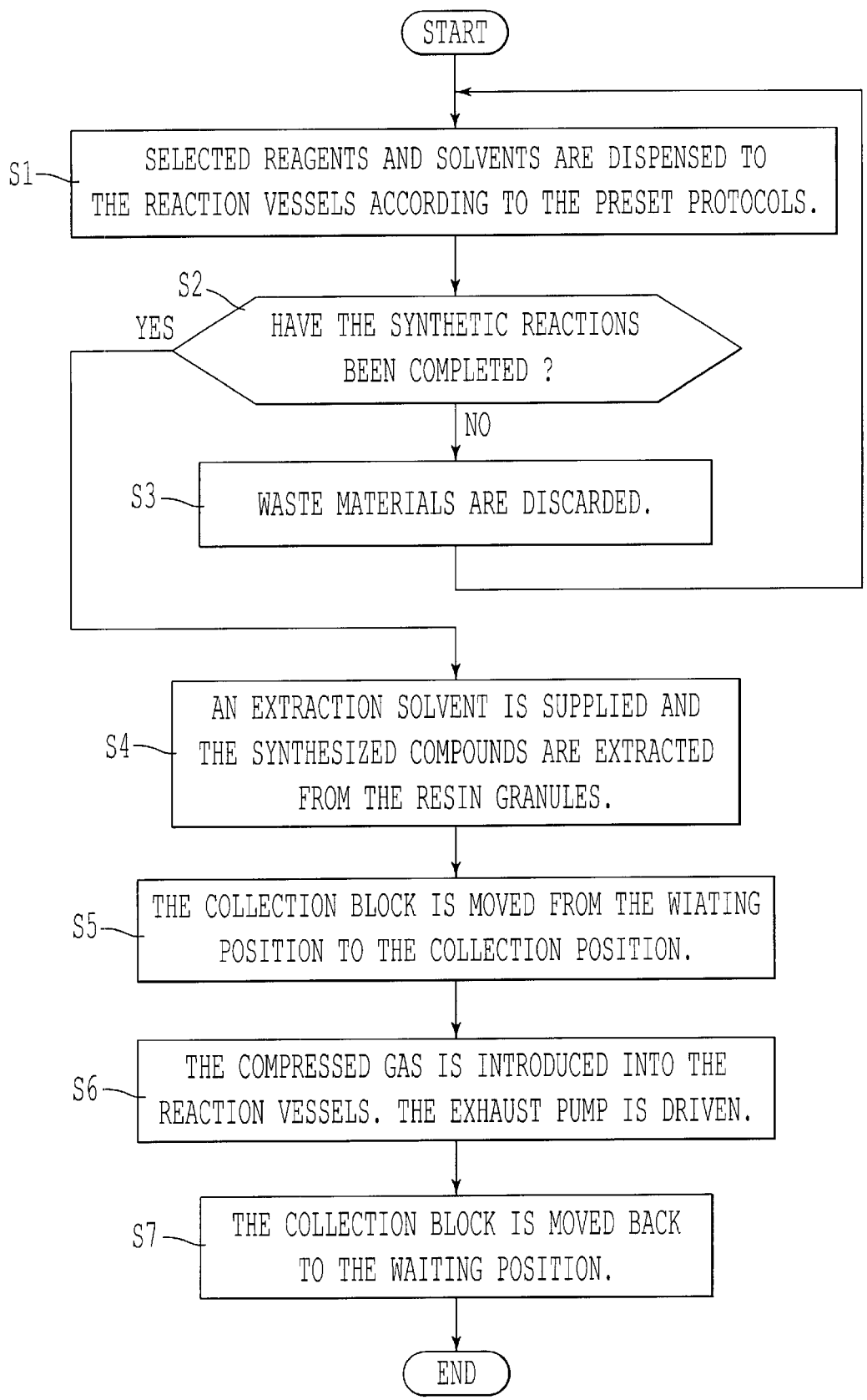
FIG. 7 is a flow chart for synthesizing compounds and collecting the synthesized compounds.

FIG. 7 is a flow chart for synthesizing compounds and collecting the synthesized compounds.

Referring to FIG. 7, at step (S1), after necessary dispensing and collection protocols have been set, selected reagents and solvents are dispensed to the reaction vessels 2 according to the dispensing protocols and synthetic reactions that take place in the reaction vessels 2.

At step (S2), the controller 25 determines whether the synthetic reactions in the reaction vessels 2 are complete. If the controller 25 determines that the synthetic reactions are complete, the routine goes to step (S4). If the controller 25 determines that the synthetic reactions are not complete, the routine goes to step (S3). At step (S3), waste materials are discarded and the routine returns to step (S1).

At step (S4), an extraction solvent, usually a strong acid such as TFA, is supplied to the reaction vessels 2 in order to extract synthesized compounds from the resin granules 14.

At step (S5), as shown in FIG. 4, the collection block 16 is moved to the collection position from the waiting position. Namely, the collection block 16 is raised until the top portions (17a) of the collection test tubes 17 come into contact with the lower surface (19d) of the plate 19 around the connecting openings (20a) and thus is set for collection.

At step (S6), the opening valve 15 is closed and the discharging gas supply valve (15a) is opened. Accordingly, the pressurized gas is introduced into the reaction vessels 2 from the gas tank (GB). Accordingly, the synthesized compounds along with the extraction solvent are transferred from the reaction vessels 2 to the collection test tubes 17. At the same time, the exhaust pump (22b) is driven. Accordingly, gas is discharged via the discharging holes 21, the branch ducts (22a) and the exhaust duct (22c).

At step (S7), the collection block 16 returns, to the waiting position. The collection of the synthesized compounds is completed.

In the automated chemical synthesizer of the first embodiment, the collection test tubes 17 communicate with the discharging holes 21 during the transfer of the synthesized compounds from the reaction vessels 2 to the collection test tubes 17. Accordingly, the gas is discharged via the discharging holes 21. As a result, the diffusion of the gas is prevented. Thus, the automated chemical synthesizer prevents its own corrosion and the harm to the people around it. Especially, in the first embodiment, the top portions (17a) of the collection test tubes 17 hermetically contact the lower surface (19d) of the plate 19. Therefore, the gas leak between the top portions (17a) of the collection test tubes 17 and the lower surface (19d) of the plate 19 is prevented.

In the first embodiment, the vibrator 35 vibrates the reaction block 1 when the collection block 16 is in the collection position. According to this procedure, the collection test tubes 17 are also vibrated along with the reaction block 1. Consequently, the generation of the gas is promoted and thus the gas is discharged efficiently.

Further, the first embodiment described above is an automated chemical synthesizer designed to synthesize organic compounds by solid phase reaction. However, the chemical synthesizer of the present invention may synthesize inorganic compounds or accommodate liquid phase reactions.

Figure 8:
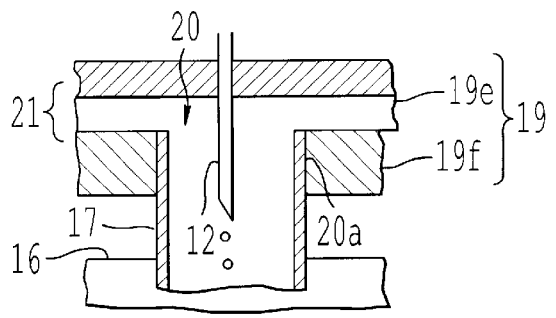
FIG. 8 is a cross-sectional view of a plate taken along an extending direction of a discharging hole when the collection block is in a collection position in an automated chemical synthesizer according to a second embodiment of the present invention.
Figure 9:
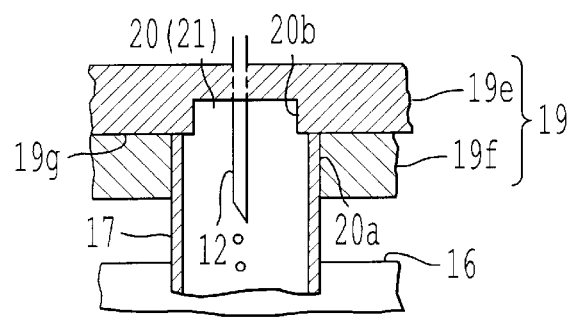
FIG. 9 is a cross-sectional view of a plate taken along a direction perpendicular to the extending direction of a discharging hole when the collection block is in the collection position in the automated chemical synthesizer according to the second embodiment of the present invention.

FIGS. 8 and 9 show an automated chemical synthesizer according a second embodiment of the present invention. Referring to FIGS. 8 and 9, a plate 19 includes an upper and lower plates (19e and 19f). A lower plate (19f) has lower connecting holes (20a) which have large diameters such that the top portions (17a) of the collection test tubes 17 fit into the lower connecting holes (20a). On the other hand, the upper plate (19e) has upper connecting holes (20b) which have diameters smaller than those of the top portions (17a) of the collection test tubes 17. Accordingly, the collection test tubes 17 fit into the connecting holes (20a) and contact the lower surface (19g) of the upper plate (19e) around the upper connecting holes (20b) when the collection block 16 is in the collection position. In the second embodiment, because the top portion of each collection test tube 17 fits into each lower connecting holes (20a) in the lower plate (19f), the collection test tubes 17 are more securely connected to the plate 19. Hence, according to the second embodiment of the present invention, the diffusion of the gas is prevented more effectively.

Figure 10:
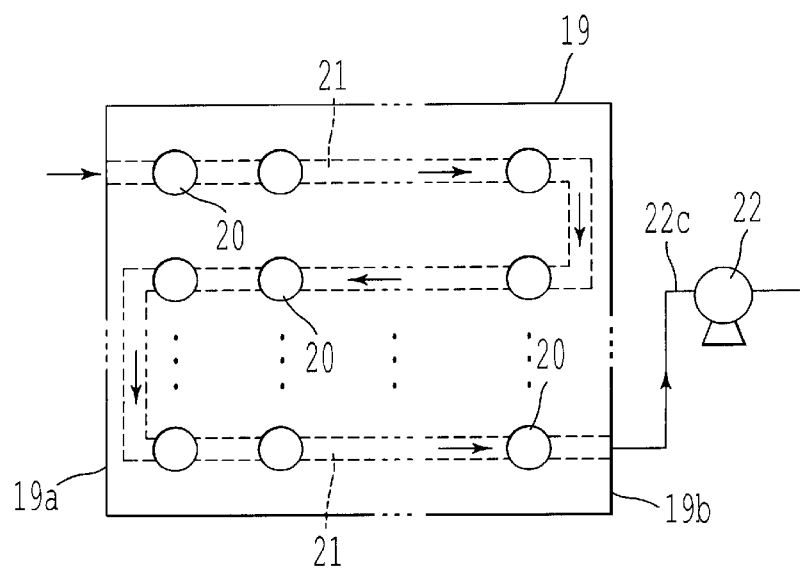
FIG. 10 is a bottom plan view of a plate of the automated chemical synthesizer according to a third embodiment of the present invention.

FIG. 10 shows an automated chemical synthesizer according a third embodiment of the present invention. Referring to FIG. 10, a plate 19 has only one discharging hole 21 transversely interconnecting all connecting holes 20. This embodiment can eliminate the branch ducts (22a) shown in FIG. 5. Although the fluid resistance of the discharging hole 21 increases in the third embodiment, the exhaust pump (22b) has a sufficient capacity to discharge the gas.

Figure 11:
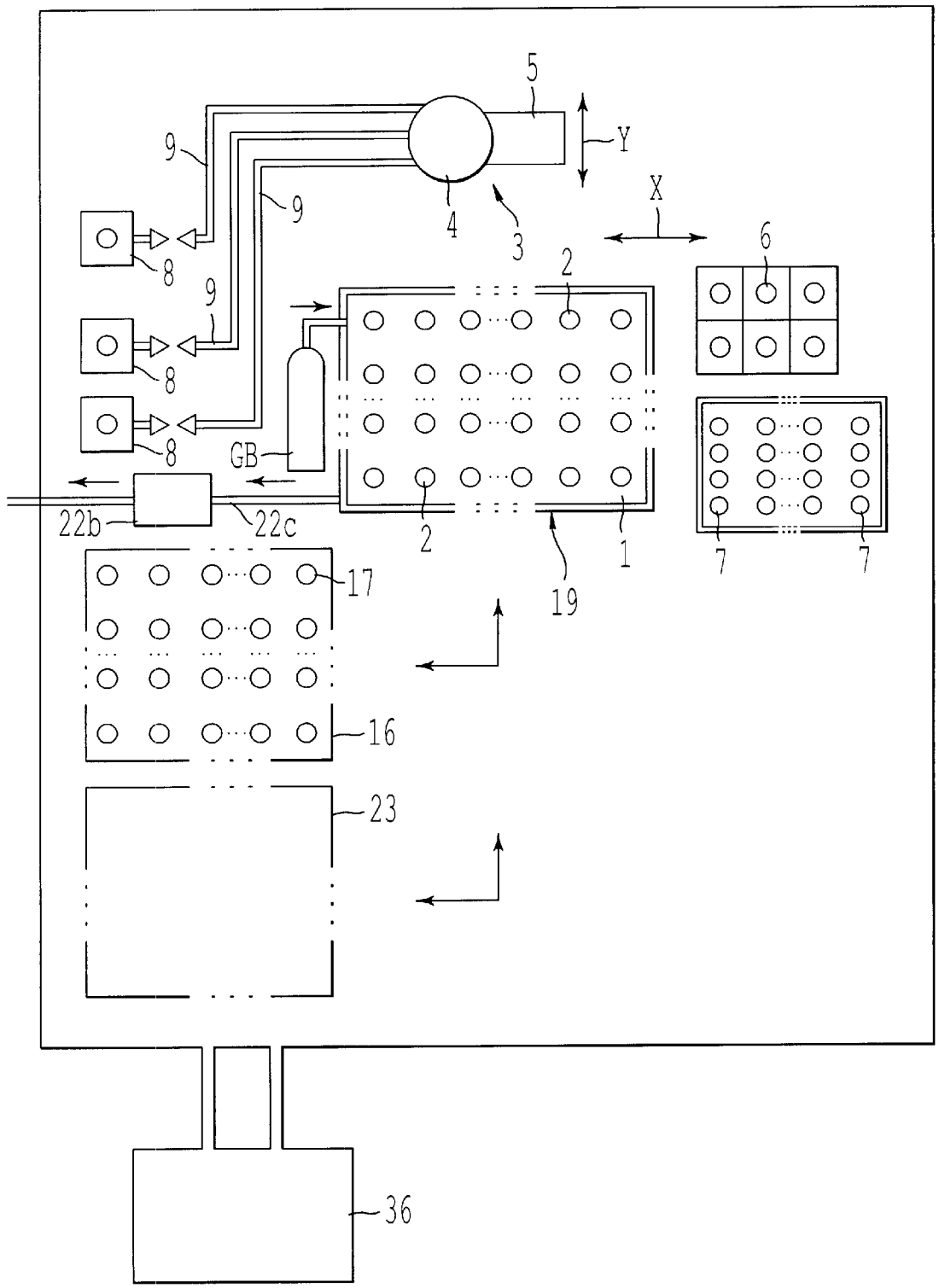
FIG. 11 is a block diagram showing an automated chemical synthesizer for synthesizing compounds according to a fourth embodiment of the present invention.

FIG. 11 shows an automated chemical synthesizer according to a fourth embodiment of the present invention. Referring to FIG. 11, in addition to the gas discharging mechanism including the discharging hole 21 and the exhaust pump (22b), the automated chemical synthesizer includes a circulator 36 which produces a gentle flow of inert gas such as argon provided in the automated chemical synthesizer.

FIG. 12 shows an automated chemical synthesizer according to a fifth embodiment of the present invention. In the first embodiment, the control unit controls only one reaction unit. However, in the fifth embodiment of the present invention as shown in FIG. 12, the control unit may control two or more reaction units.

Obviously, numerous modifications and variations of the present invention are possible in light of the above teachings. It is therefore to be understood that, within the scope of the appended claims, the invention may be practiced otherwise than as specifically described herein.

What is claimed as new and is desired to be secured by Letters Patent of the United States is:

1. An automated chemical synthesizer comprising:
    at least one reaction vessel in which a compound is to be synthesized;
    at least one collection vessel configured to be connected to said at least one reaction vessel in order to collect said compound from said at least one reaction vessel;
    a passage configured to communicate with said at least one collection vessel;
    a gas discharging unit provided in said passage and configured to discharge gas from said at least one collection vessel through said passage; and
    a passage block in which said passage is formed and which is provided between said at least one reaction vessel and said at least one collection vessel when said at least one collection vessel is connected to said at least one reaction vessel in a collection position,
    wherein said passage formed in said passage block comprises,
        at least one connecting hole which is provided to correspond to said at least one collection vessel, said at least one collection vessel contacting said passage block around said at least one connecting hole, and
        at least one discharging hole connecting said at least one connecting hole, and
    wherein said passage block comprises upper and lower plates, a lower portion of said at least one connecting hole formed in said lower plate has a size such that a top portion of said at least one collection vessel fits into said lower portion, and an upper portion of said at least one connecting hole formed in said upper plate has a size such that a top portion of said at least one collection vessel contacts said upper plate around said upper portion.

2. An automated chemical synthesizer according to claim 1, wherein said at least one collection vessel is configured to be connected to said passage in an airtight manner.

3. An automated chemical synthesizer according to claim 1, further comprising a moving mechanism configured to move said at least one collection vessel between a collection position in which said at least one collection vessel is connected to said at least one reaction vessel and a waiting position in which said at least one collection vessel is not connected to said at least one reaction vessel.

4. An automated chemical synthesizer according to claim 3, wherein said at least one collection vessel is configured to be connected to said passage in an airtight manner when said at least one collection vessel is in said collection position.

5. An automated chemical synthesizer according to claim 3, wherein said at least one reaction vessel includes a drainage tube which extends to an inside of said at least one collection vessel when said at least one collection vessel is in said collection position.

6. An automated chemical synthesizer according to claim 1, wherein further comprising a controller said gas discharging unit is driven by said controller during substantially an entire period of time in which said compound is collected from said at least one reaction vessel to said at least one collection vessel.

7. An automated chemical synthesizer according to claim 1, further comprising a controller wherein said gas discharging unit is driven during a period within the entire period of time in which said compound is collected from said at least one reaction vessel to said at least one collection vessel.

8. An automated chemical synthesizer according to claim 1, further comprising:
   a gas supplier configured to supply pressurized gas to said at least one reaction vessel in order to move said compound from said at least one reaction vessel to said at least one collection vessel.

9. An automated chemical synthesizer according to claim 8, further comprising:
   a solvent supplier configured to supply solvent in order to extract said compound from resin granules provided in said at least one reaction vessel.

10. An automated chemical synthesizer according to claim 1, said passage includes branch ducts connected to said at least one discharging hole.

11. An automated chemical synthesizer according to claim 1, wherein said at least one discharging hole comprises a single hole which connects all of said at least one connecting hole.

12. An automated chemical synthesizer according to claim 1, wherein the lower plate is made from an elastic material.

13. An automated chemical synthesizer according to claim 1, wherein the lower plate is made from teflon.

14. An automated chemical synthesizer according to claim 1, further comprising:
   a filter provided in the at least one reaction vessel to close a bottom portion of the at least one reaction vessel, the filter having a property that a liquid passes through the filter when the liquid is pressurized.

15. An automated chemical synthesizer according to claim 1, further comprising:
   a vibrator configured to vibrate said at least one collection vessel via said at least one reaction vessel when said at least one collection vessel is in a collection position.

16. An automated chemical synthesizer according to claim 1, further comprising:
   a circulator configured to produce a flow of inert gas provided inside the automated chemical synthesizer.

* * * * *